US008065668B2

(12) United States Patent
Bosworth et al.

(10) Patent No.: US 8,065,668 B2
(45) Date of Patent: *Nov. 22, 2011

(54) UNIFIED DATA TYPE SYSTEM AND METHOD

(75) Inventors: George H. Bosworth, Woodinville, WA (US); Patrick H. Dussud, Bellevue, WA (US); James S. Miller, Bellevue, WA (US); Daryl B. Olander, Boulder, CO (US)

(73) Assignee: Microsoft Corporation, Redmond, WA (US)

( * ) Notice: Subject to any disclaimer, the term of this patent is extended or adjusted under 35 U.S.C. 154(b) by 1142 days.

This patent is subject to a terminal disclaimer.

(21) Appl. No.: 10/848,402

(22) Filed: May 17, 2004

(65) Prior Publication Data
US 2004/0216094 A1     Oct. 28, 2004

Related U.S. Application Data

(63) Continuation of application No. 09/614,158, filed on Jul. 11, 2000, now Pat. No. 6,738,968, which is a continuation-in-part of application No. 09/613,289, filed on Jul. 10, 2000, now abandoned.

(51) Int. Cl.
G06F 9/45  (2006.01)
G06F 9/44  (2006.01)
(52) U.S. Cl. ........................................ 717/141; 717/120
(58) Field of Classification Search .................. None
See application file for complete search history.

(56) References Cited

U.S. PATENT DOCUMENTS

| 5,339,424 A | 8/1994 | Fushimi |
| 5,375,242 A | 12/1994 | Kumar et al. |
| 5,577,253 A | 11/1996 | Blickstein |
| 5,613,117 A | 3/1997 | Davidson et al. |
| 5,659,753 A | 8/1997 | Murphy et al. |
| 5,689,703 A | 11/1997 | Atkinson et al. |
| 5,873,097 A | 2/1999 | Harris et al. |
| 5,889,992 A | 3/1999 | Koerber |
| 5,923,882 A | 7/1999 | Ho et al. |

(Continued)

FOREIGN PATENT DOCUMENTS
GB           1 367 741           9/1974
(Continued)

OTHER PUBLICATIONS

SNAP Foundation Template Using the SNAP Language Version 8.0, Template Software, Inc.*

(Continued)

Primary Examiner — Li Zhen
Assistant Examiner — Evral Bodden
(74) Attorney, Agent, or Firm — Merchant & Gould PC

(57) ABSTRACT

A type system includes a dual representation for basic data types. One representation is the basic data type representation common to such basic built-in data types, known as an unboxed value type or simply as a value type. Each of the basic data types also has a boxed representation that can be stored in the object hierarchy of the type system. This dual representation can also be extended to user-defined types, so that user-defined types may exist both as an unboxed value type and as an object within the object hierarchy of the type system. This dual representation allows the compiler and/or runtime environment to select the most effective and efficient representation for the data type depending on the particular need at the moment.

14 Claims, 9 Drawing Sheets

U.S. PATENT DOCUMENTS

| | | | |
|---|---|---|---|
| 5,937,409 A * | 8/1999 | Wetherbee | 707/103 R |
| 5,987,242 A | 11/1999 | Bentley et al. | 703/13 |
| 5,987,247 A | 11/1999 | Lau | |
| 6,058,455 A | 5/2000 | Islam et al. | |
| 6,061,690 A | 5/2000 | Nori et al. | |
| 6,067,413 A | 5/2000 | Gustafsson et al. | |
| 6,101,502 A | 8/2000 | Heubner et al. | |
| 6,246,403 B1 * | 6/2001 | Tomm | 715/762 |
| 6,260,074 B1 * | 7/2001 | Radia et al. | 719/330 |
| 6,282,670 B1 | 8/2001 | Rezaul Islam et al. | |
| 6,336,161 B1 | 1/2002 | Watts | |
| 6,353,452 B1 * | 3/2002 | Hamada et al. | 715/825 |
| 6,370,682 B1 | 4/2002 | Eckhardt et al. | 717/141 |
| 6,381,735 B1 | 4/2002 | Hunt | 717/158 |
| 6,457,172 B1 | 9/2002 | Carmichael et al. | 717/141 |
| 6,523,027 B1 * | 2/2003 | Underwood | 707/4 |
| 6,560,699 B1 | 5/2003 | Konkle | |
| 6,601,233 B1 * | 7/2003 | Underwood | 717/102 |
| 6,609,128 B1 * | 8/2003 | Underwood | 707/10 |
| 6,738,968 B1 * | 5/2004 | Bosworth et al. | 717/157 |
| 6,836,883 B1 | 12/2004 | Abrams et al. | |
| 6,915,324 B1 * | 7/2005 | Allavarpu et al. | 709/200 |
| 7,735,071 B2 | 6/2010 | Abrams et al. | |
| 2004/0143823 A1 | 7/2004 | Wei | |

FOREIGN PATENT DOCUMENTS

| | | |
|---|---|---|
| JP | 3-102427 | 4/1991 |
| WO | WO 99/42925 | 8/1999 |

OTHER PUBLICATIONS

"Software Systems Constructions with Examples in ADA" by Bo Sanden, (7 pages) pp. 104-109, published 1994.*
Microsoft Corporation, "C# Version 2.0 Specification", pp. 1-100, May 2004.*
Deitel & Deitel "C++ How to Program", Second Edition, pp. 192-194, Published 1998, 1994.*
Y.G. Park and B. Goldberg, Escape analysis on lists. In *ACM SIGPLAN Conference on Programming Language Design and Implementation*, ACM Press, 1992, pp. 116-127.
S. Peyton Jones and J. Launchbury, Unboxed values as first class citizens. In *Functional Programming Languages and Computer Architecture*, vol. 523 *of Lecture Notes in Computer Science*, Springer-Verlag, 1991, pp. 636-666.
M. Tofte and J.P. Talpin, Region-based memory management. *Information and Computation*, 1997, 132(2), pp. 109-176.
X. Leroy. Unboxed objects and polymorphic. In *19th ACM SIGPLAN-SIGACT Symposium on Principles of Programming Languages*, ACM Press, 1992, pp. 177-0188.
A.D. Gordon and D. Syme, *Typing a multi-language intermediate code*. Submitted to The 28th ACM Principles of Programming Languages, (Feb. 2001), pp. 1-9.
U.S. Appl. No. 09/598,105, Titled: Method and System for Compiling Multiple Languages, filed Jun. 21, 2000.
Lindholm, Tim & Yellin, Frank, "The Java Virtual Machine Specification, Second Edition," Sun Microsystems, 1999, Ch. 2, pp. 1-44.
Henglein, Fritz & Jorgensen, Jasper, "Formally Optimal Boxing," Proceedings of the 21st ACM SIGPLAN-SIGACT Symposium on Principles of Programming Languages, 1994, pp. 213-216.
Thiemann, Peter, "Unboxed values and polymorphic typing revisiting," Proceedings of the 7th International Conference on Functional Programming Languages and Computer Architecture, 1995, pp. 24-35.
Shao, Zhong, "Flexible Representation Analysis," Proceedings of the second ACB SIGPLAN International Conference on Functional Programming, 1997, pp. 85-98.
James O. Coplien Ed, "*Advanced C++ programming styles and idioms; IDSBN: 0-201-54855-0*" 1992, Reeding, Addition Wesley, US, pp. 43 92-93, 108, XP002148185, *p. 135, Line 15-Last Line*, *p. 137, Figure 5-6*.
European Search Report for EP 01 11 6860 dated Jul. 31, 2007.
SNAP—Using the SNAP Language, Template Software, Chapter 7, published 1997, 35 pgs.
Rational Rose/C++, Rational Software Corporation, whole manual, released 1996 (2 parts), 210 pgs.
Burnett et al, Visual Object-Oriented Programming, pp. 1-42, 199-274, published 1994 (2 parts), 130 pgs.
GNU Tools, manual page of GCC (http://www.freebsd.org/cgi/man.cgi?query=gcc&apropos=0&sektion=0&manpath=FreeBSD+4.8-RELEASE&format=html), Dec. 16, 1998, 34 pgs.
GNU Development Tools, manual page of ar (http://www.freebsd.org/cgi/man.cgi?query=ar&apropos=0&sektion=0&manpath=FreeBSD+4.8-RELEASE&format=html), 1999, 5 pgs.
Gosling et al, "The Java Language Environment. A White Paper", Sun Microsystems Computer Company, Oct. 1, 1995, pp. 1, 4-85, XP 002042922, 86 pgs.
Andrew Johnson, James Loveluck and Ira Goldstein; The ANDF Technology Program at the OSF RI; Dec. 8, 1992, 6 pgs.
Christian Fabre, Francois de Ferriere, Fred Roy; Java-ANDF Feasibility Study Final Report; Mar. 26, 1997, 12 pgs.
Dr. N.E. Peeling; ANDF Features and Benefits; Feb. 5, 1993, 9 pgs.
Schmidt and Voller, "A Multi-Language Compiler System with Automatically Generated Codegenerators", 1984, ACM, pp. 202-212.
Schmidt and Voller, "Experience With VDM in NORSK Data", 1987, VDM-Europe Symposium, Brussels, Belgium, pp. 50-62.
Appel et al., "The Zephyr Compiler Infrastructure", Nov. 1998, http://www.cs.virginia.edu/zephyr/, pp. 1-10.
Appel et al., "Scaling Proof-Carrying Code to Production Compilers and Security Policies", Jan. 1999, DARPA-.
EPO Communication dated Feb. 13, 2008 issued in European Application No. 01 11 6860, 8 pgs.
Response to EPO Communication dated Aug. 26, 2008 filed in European Application No. 01 11 6860, 18 pgs.
Notice of Rejection dated Mar. 2, 2007 issued in Japanese Application No. 2001-209530 (translated), 13 pgs.
Notice of Rejection dated Jul. 6, 2007 issued in Japanese Application No. 2001-209530 (translated), 7 pgs.
Interrogation dated Dec. 18, 2009 issued in Japanese Application No. 2001-209530 (translated), 7 pgs.
Notice of Rejection dated Aug. 6, 2010 issued in Japanese Application No. 2001-209530 (translated), 29 pgs.
Decision to Decline the Amendment dated Aug. 13, 2010 issued in Japanese Application No. 2001-209530 (translated), 7 pgs.
Appeal Decision dated Dec. 3, 2010 issued in Japanese Application No. 2001-209530 (translated), 4 pgs.
Notice of Rejection dated Apr. 21, 2009 issued in Japanese Application No. 2007-287939 (translated), 9 pgs.
Notice of Rejection dated Sep. 11, 2009 issued in Japanese Application No. 2007-287939 (translated), 6 pgs.
Notice of Rejection dated Jan. 8, 2010 issued in Japanese Application No. 2007-287939 (translated), 2 pgs.
Decision to Decline the Amendment dated Jan. 8, 2010 issued in Japanese Application No. 2007-287939 (translated), 4 pgs.
Notice of Rejection dated Sep. 3, 2010 issued in Japanese Application No. 2007-287939 (translated), 3 pgs.
Notice of Allowance dated Dec. 24, 2010 issued in Japanese Application No. 2007-287939 (translated), 6 pgs.
C Magazine, vol. 2, No. 1, p. 112, SOFTBANK Japan Corp., Japan, Jan. 1, 1990, 1 pg.
EPO Communication dated Jun. 12, 2006 issued in European Application No. 01 115 100, 13 pgs.
Response to EPO Communication dated Oct. 23, 2006 issued in European Application No. 01 115 100.
Summons to attend oral proceedings dated Sep. 19, 2007 issued in European Application No. 01 115 100, 9 pgs.
Response to Summons to attend oral proceedings dated Nov. 9, 2007 issued in European Application No. 01 115 100, 20 pgs.
Result of consultation dated Dec. 12, 2007 issued in European Application No. 01 115 100, 5 pgs.
Result of consultation dated Dec. 21, 2007 issued in European Application No. 01 115 100, 3 pgs.
Minutes of Oral Proceedings dated Dec. 28, 2007 issued in European Application No. 01 115 100, 12 pgs.
Decision to Refuse a European Patent Application dated Mar. 10, 2008 issued in European Application No. 01 115 100, 17 pgs.

Statement of grounds for Appeal dated Jul. 18, 2008 issued in European Application No. 01 115 100, 28 pgs.
Office Action dated May 30, 2007 issued in U.S. Appl. No. 10/889,924, 27 pgs.
Response to Office Action dated Aug. 30, 2007 filed in U.S. Appl. No. 10/889,924, 36 pgs.
Office Action dated Nov. 13, 2007 issued in U.S. Appl. No. 10/889,924, 30 pgs.
Response to Office Action dated Jan. 11, 2008 filed in U.S. Appl. No. 10/889,924, 16 pgs.
Advisory Action dated Feb. 5, 2008 issued in U.S. Appl. No. 10/889,924, 4 pgs.
Response to Advisory Action dated Feb. 13, 2008 filed in U.S. Appl. No. 10/889,924, 7 pgs.
Office Action dated May 1, 2008 issued in U.S. Appl. No. 10/889,924, 11 pgs.
Response to Office Action dated Aug. 1, 2008 filed in U.S. Appl. No. 10/889,924, 11 pgs.
Office Action dated Nov. 10, 2008 issued in U.S. Appl. No. 10/889,924, 11 pgs.
Response to Office Action dated Feb. 10, 2009 filed in U.S. Appl. No. 10/889,924, 11 pgs.
Office Action dated Apr. 13, 2009 issued in U.S. Appl. No. 10/889,924, 9 pgs.
Response to Office Action dated Aug. 13, 2009 filed in U.S. Appl. No. 10/889,924, 8 pgs.
Supplemental Amendment dated Oct. 27, 2009 filed in U.S. Appl. No. 10/889,924, 8 pgs.
Notice of Allowance dated Jan. 26, 2010 issued in U.S. Appl. No. 10/889,924, 5 pgs.
Amendment After Notice of Allowance dated Apr. 26, 2010 filed in U.S. Appl. No. 10/889,924, 6 pgs.
Response to Amendment After Notice of Allowance dated May 4, 2010 issued in U.S. Appl. No. 10/889,924, 3 pgs.
Office Action dated Nov. 21, 2002 issued in U.S. Appl. No. 09/598,105, 11 pgs.
Response to Office Action dated Mar. 21, 2003 filed in U.S. Appl. No. 09/598,105, 27 pgs.
Office Action dated Jul. 15, 2003 filed in U.S. Appl. No. 09/598,105, 11 pgs.
Response to Office Action dated Sep. 15, 2003 filed in U.S. Appl. No. 09/598,105, 11 pgs.
Advisory Action dated Oct. 14, 2003 filed in U.S. Appl. No. 09/598,105.
Response to Office Action dated Dec. 12, 2003 filed in U.S. Appl. No. 09/598,105.
Supplemental Response to Office Action dated Dec. 15, 2003 filed in U.S. Appl. No. 09/598,105.
Office Action dated Jan. 26, 2004 filed in U.S. Appl. No. 09/598,105.
Response to Office Action dated Apr. 26, 2004 filed in U.S. Appl. No. 09/598,105.
Notice of Allowance dated Jun. 3, 2004 filed in U.S. Appl. No. 09/598,105.
Notice of Rejection issued in 2007 in Japanese Application No. 2001-164625 (translated).
Notice of Rejection issued in Aug. 2007 in Japanese Application No. 2001-164625 (translated).

* cited by examiner

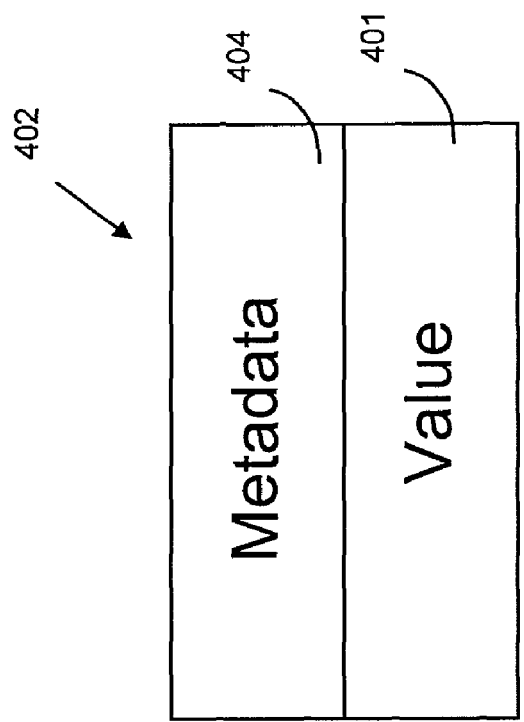
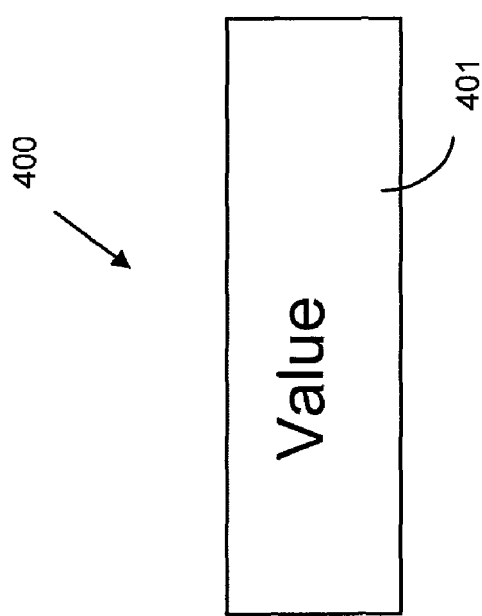
FIG. 4

UNIFIED DATA TYPE SYSTEM AND METHOD

CROSS REFERENCE TO RELATED APPLICATIONS

This application is a continuation of and claims the benefit of U.S. patent application Ser. No. 09/614,158, now U.S. Pat. No. 6,738,968, entitled UNIFIED DATA TYPE SYSTEM AND METHOD and filed on Jul. 11, 2000, and which is a continuation-in-part of U.S. patent application Ser. No. 09/613,289, entitled UNIFIED DATA TYPE SYSTEM AND METHOD and filed on Jul. 10, 2000, now abandoned, both of which are incorporated herein by reference.

TECHNICAL FIELD

The present invention relates to a system and method for defining and processing data types and more particularly relates to type systems used by a compiler and/or runtime environment.

BACKGROUND OF THE INVENTION

Almost from the beginning, computer programming languages have embodied the notion of data types. Data types include such basic concepts as a character, string, integer, float, and so forth. At its lowest level, data stored in a computer is a simple bit pattern stored in a location of a particular size (e.g., a 32-bit memory location). Data types define the notion of how to interpret the bit pattern. For example, a particular bit pattern in a storage location of a particular size might be interpreted one way if the storage location was deemed to hold a "character" and another way if the storage location was deemed to hold an "integer".

In some computer languages, although the notion of data type exists, few rules are enforced either by the compiler or any associated runtime for mixing of different data types in expressions of a computer program. So no compiler error will be generated in the C programming language, for example, if an integer value is multiplied by a floating point number value. In order to minimize various types of errors, many such languages had built-in type rules that allowed for the implicit conversion of certain data types. In other instances, languages included explicit constructs to "coerce" or convert one data type into another data type. Needless to say, although such languages provided great flexibility, certain programming errors could be introduced if care was not taken when mixing data types in various programming expressions.

Strongly typed languages tried to reduce the instances of programming errors by enforcing strict typing rules. In strongly typed languages, a compiler error would be generated when data type mismatches were detected. For example, a compiler error would be generated in Pascal if a programmer tried to assign a character value to an integer variable. This had the effect of reducing certain types of programming errors, but the rules seemed to be too restrictive.

With the advent of object oriented programming languages, the concept of data types took on new meaning. In object oriented languages, objects may typically be represented by an object class hierarchy, where some objects are derived from (or inherit) fields (also referred to as properties) and methods from other "base class" objects. Objects in these languages can be a mixture of fields (typically represented by variables of a particular data types) and methods or functions which allow manipulation of the fields or which provide certain functionality. In addition, object oriented languages also typically include a number of built-in data types, such as float, integer, character, string and so forth, which can be used either as basic variables or as fields in an object. Thus, in Java, for example, a programmer can define a variable of type integer and define an object with fields, one of which is of the "integer" data type.

In object oriented programming languages, there can be different treatment for objects and basic data types. For example, an object with a single property of type integer and a variable of type integer would not be considered to be of the same data type in many object oriented languages, although at the bottom, both simply represent an integer. The variable of type integer simply exists as a bit pattern in a particular storage location with no additional information, while the object has a storage location of the same size and additional information (or "metadata") that describes how to interpret the value in the storage location.

To provide some sort of equivalency between an object representation and a basic data type representation, the notion of "boxing" was conceived. The process of adding metadata to a basic data type representation to yield an object representation is termed "being". Similarly, removing the metadata from an object representation to yield a basic data type representation is termed "unboxing". However, even with the development of boxing and unboxing, present compilers and/or runtime systems use a fragmented notion of data types with strict separation between the notion of objects and the notion of basic data type representations. Although this separation has many implications, one area where the implications are quite apparent is in how these languages treat user-defined types.

Even prior to object oriented programming, many, if not most, programming languages had the notion of user-defined data types. These programming languages allowed a programmer to build up new "data types" from the basic built-in types of the language. For example, a programmer could define a new type "data_point" as consisting of an x coordinate value of type float and a y coordinate value of type float. Certain object oriented programming languages, like Java, however, do not allow extension of the basic built-in types in this manner. In some such implementations, user-defined types are only allowed in the form of objects. Existing solutions have also failed to adequately address the need for a unified data type system that can be applied during runtime.

The present invention addresses, among other things, a mechanism to avoid the currently fragmented view of data types. The invention also addresses the inefficiencies associated with using basic data types where object types would be more efficient and object types where basic data types would be more efficient.

SUMMARY OF THE INVENTION

In accordance with the present invention, the above and other problems are solved by providing a system and method for efficiently processing user-defined data types. The present invention provides for a more unified view of the type system of programming languages, and object oriented programming languages in particular. In the present invention, the type system includes a dual representation for basic data types. One representation is the basic data type representation common to such basic built-in data types. In this application this representation will be referred to as a value type representation, or more simply, a value type. However, unlike other type systems, each of the basic data types also has a boxed representation that exists in the object hierarchy of the type system itself. This dual representation can also be extended to user-defined types, so that user-defined types may exist both as a value type and as an object within the object hierarchy of the type system. This allows the compiler and/or runtime to select the most effective and efficient representation for the data type depending on the particular need at the moment.

In addition to the dual representation of data types, another aspect of the invention allows for the application of rules to determine when to use the boxed representation and when to use the value type (or unboxed) representation of a data type. These rules can be applied, for example, by a compiler and allow, among other things, for implicit conversion between the boxed and unboxed representations of a particular data type.

In another aspect of the invention, the unified view of the type system is reflected in the behavior of virtual methods for objects. One basic feature of objects is that they can inherit methods from "parent" objects. Such methods may include methods that take objects as arguments. The dual representation of value types both as value types and as objects in the hierarchy implies that value types can have methods and can behave as objects in some instances and as value types in other instances. Although the details are discussed more completely below, the practical effect is that when value types are in their boxed representation, they can possess type information like other objects. Furthermore, when value types are in their unboxed representation, they can be valid arguments to methods that would otherwise expect an object type (such as a boxed representation). This approach provides entirely new and powerful programming paradigms to developers. Furthermore, since both boxed and unboxed representations are available, all this functionality can be provided without the developer having to explicitly specify in the source code the value type version (i.e., boxed or unboxed) to use or the conversion from one form to another.

In one implementation of the present invention, a unified type system is provided in a runtime environment. A source code file includes an unboxed value type representation. Metadata is associated with the unboxed value type representation for converting the unboxed value type representation into a boxed value type representation. Output code is generated from the compiler converting between the unboxed value type representation and the boxed value type representation in response to a detection of different types in a runtime operation.

In another implementation of the present invention, a method for compiling a source file containing at least one unboxed value type representation is provided. It is determined that the source file includes the unboxed value type representation. Metadata is associated with the unboxed value type representation, responsive to the determining operation. An operation having operands with differing types is specified in the source file. One operand is the unboxed value type representation and another operand is a boxed value type representation. Output code is emitted from the compiler for converting one of the operands to match the type of the other operand.

In other implementations of the present invention, articles of manufacture are provided as computer program products. One embodiment of a computer program product provides a computer program storage medium readable by a computer system and encoding a computer program for compiling a source file containing at least one unboxed value type representation. Another embodiment of a computer program product may be provided in computer data signal embodied in a carrier wave by a computing system and encoding the computer program for compiling a source file containing at least one unboxed value type representation. The computer program product encodes a computer program for executing on a computer system a computer process for compiling a source file containing at least one unboxed value type representation. It is determined that the source file includes the unboxed value type representation. Metadata is associated with the unboxed value type representation, responsive to the determining operation. An operation having operands with differing types is specified in the source file. One operand is the unboxed value type representation and another operand is a boxed value type representation. Output code is emitted from the compiler for converting one of the operands match the type of the other operand.

In a further aspect of the invention, the notion can be combined with a runtime or execution environment to produce a unique runtime environment that supports value types, object classes, and interfaces.

These and various other features as well as advantages, which characterize the present invention, will be apparent from a reading of the following detailed description and a review of the associated drawings.

BRIEF DESCRIPTION OF THE DRAWINGS

FIG. 4 depicts a set of boxed and unboxed data types.

DETAILED DESCRIPTION OF THE INVENTION

Exemplary embodiments of the present invention provide for a more unified view of the type system of programming languages, and object oriented programming languages in particular. An exemplary type system includes a dual representation for basic data types. One representation is the basic data type representation referred to as an unboxed value type or simply as a value type. An unboxed value type is generally not accompanied by type information in the output code emitted from a compiler. In an embodiment of the present invention, however, each of the basic data types also has a boxed representation that exists in the object hierarchy of the type system and is accompanied by type information (e.g., specified by metadata) in the output code emitted from the compiler.

This dual representation can also be extended to user-defined types, so that user-defined types may exist both as an unboxed value type and as an object (i.e., boxed value type) within the object hierarchy of the type system. This allows the compiler and/or runtime to select the most effective and efficient representation for the data type depending on the particular need at the moment.

Figure 1:
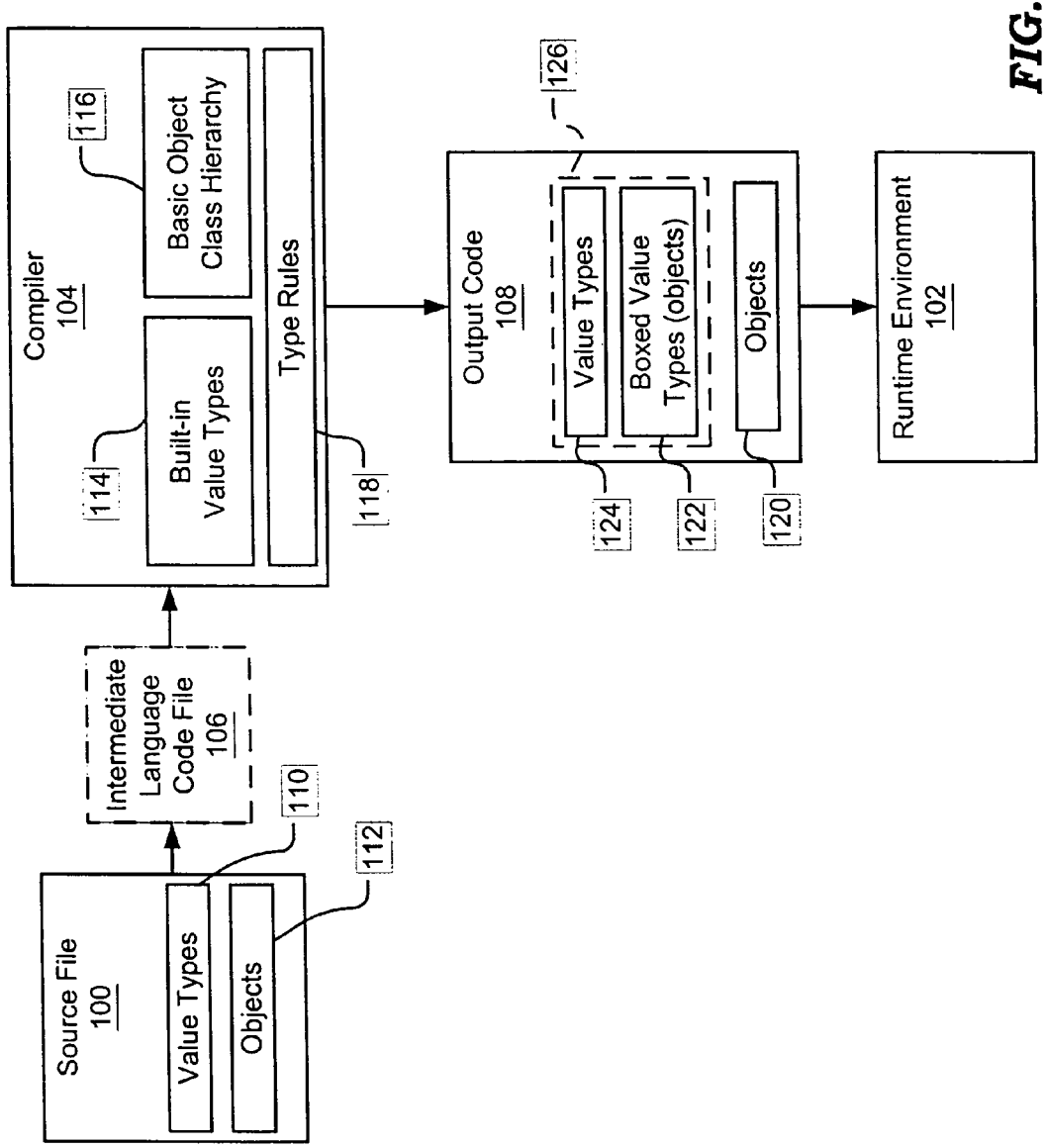
FIG. 1 depicts a logical representation of an exemplary compiler operative to provide a unified view of a type system according to an embodiment of the present invention.
Figure 5:
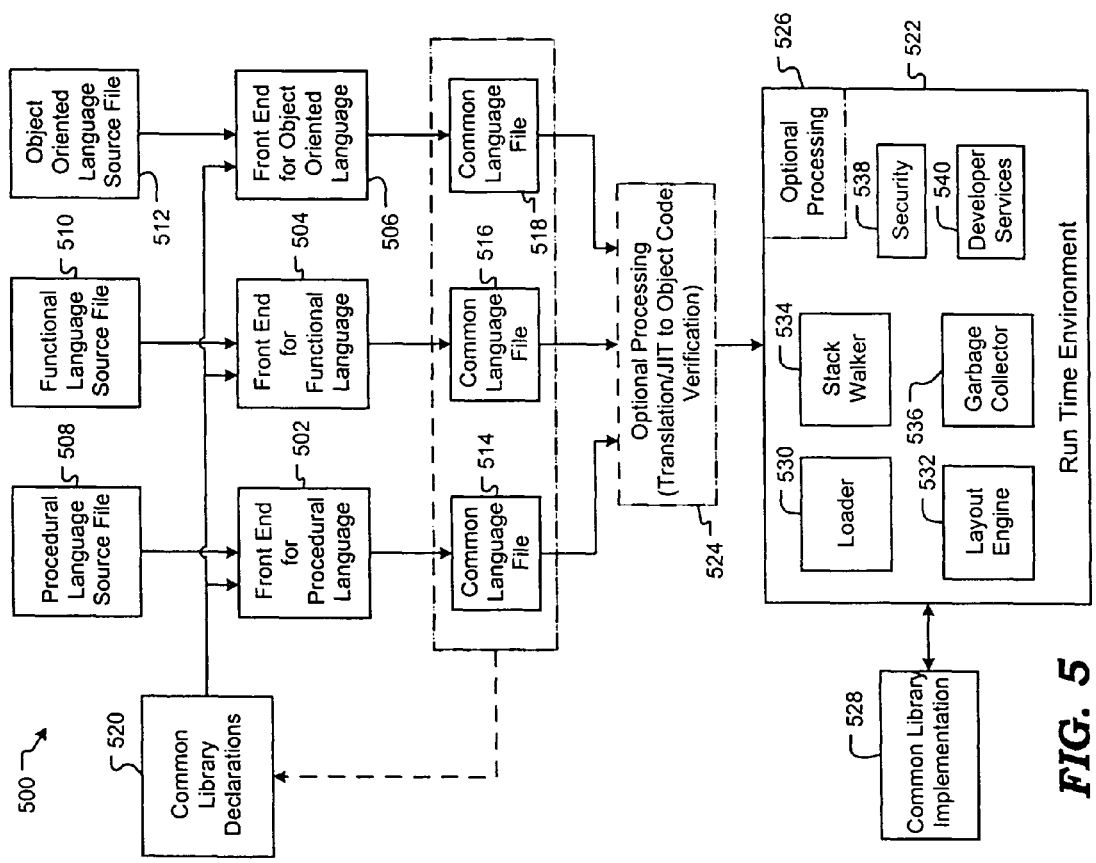
FIG. 5 depicts a more detailed logical representation of the exemplary compiler system of FIG. 1.

FIG. 1 depicts a logical representation of a compiler operating to provide a unified view of a type system in an embodiment of the present invention. A source file 100 represents source program code that is prepared in compliance with a given programming language specification, including without limitation specifications relating to C Language, C++, or any other high level source programming language or intermediate language. The source file 100 may include instructions and data for performing one or more operations in a runtime environment 102. In the illustrated embodiment, the source file 100 is received by a compiler 104, which translates the source code into output code 108 (e.g., object code or executable code). In an alternative embodiment of the present invention, it should be understood that the compiler 104 may be incorporated into the runtime environment 102 (e.g., as a Just-In-Time (JIT) compiler) as shown in FIG. 5.

In an alternative embodiment of the present invention, the source code of the source file 100 may first be translated into an intermediate language before being received by the compiler 104, as represented by an intermediate language code file 106. It should be understood that the following discussion addresses an embodiment in which source file 100 is input to the compiler 104, although it is contemplated that either source code or intermediate code may be input to the compiler 104 in an embodiment of the present invention. Likewise, both source code and intermediate code may have compatible structures and syntaxes for defining data and associated data types within the scope of the present invention.

Generally, a compiler is a program that translates source code (or intermediate language code) into object code or executable code. The compiler derives its name from the way it works, looking at an entire piece of source code and collecting and reorganizing the instructions and data therein. In some implementations, a second stage includes a linker that links the compiled object code with other object code to produce an executable program. In other implementations, this linking process is performed just prior to or during runtime and is referred to as "late binding" or "runtime binding".

As discussed, programming languages typically have a notion of data types. Data within the source file 100 generally consists of two data types: (1) value types 110 and (2) objects 112.

For clarity, classes and object names as discussed herein are represented by capitalized names and value types and value type variable names are labeled with lower case names. Data may be defined in a source file as a "value type" using a variable name and an associated type indicator. For example, data representing an index may be defined as "int index;", where "int" is the data type indicator and "index" is the variable name. Alternatively, data may be defined in a source file as an "object" using an object name, a class indicator, and a class definition. For example, the exemplary source code set forth below defines a class called Rect, comprising four Cartesian coordinates defining the four corners of a rectangle.

class Rect
{
   Cartesian UpperLeft;
   Cartesian UpperRight;
   Cartesian LowerLeft;
   Cartesian LowerRight;
   float area;
}
Rect RectObject;

The statement "Rect RectObject" defines an object "RectObject" (the object name) of class "Rect" (the class indicator). Note that the RectObject may also include other objects and value types, such as objects "UpperLeft", "UpperRight", "LowerLeft", and "LowerRight", of class Cartesian (the class definition of which is not shown) and a value type "area" of data type "float". It should also be understood that the discussion above merely represents an exemplary definition of data in a source file, and that alternative data structures and syntaxes of data definition are contemplated within the scope of the present invention.

The compiler 104 may include or have access to one or more of a variety of built-in data types, including built-in value types 114 and a basic object class hierarchy 116, and type rules 118 for converting between and defining the relationship between various data types. Generally, built-in value types represent value types that are believed to be fundamental to the programming language and commonly used by programmers, such as "int" for an integer, "char" for a character, and "float" for a floating point number.

Figure 3A:
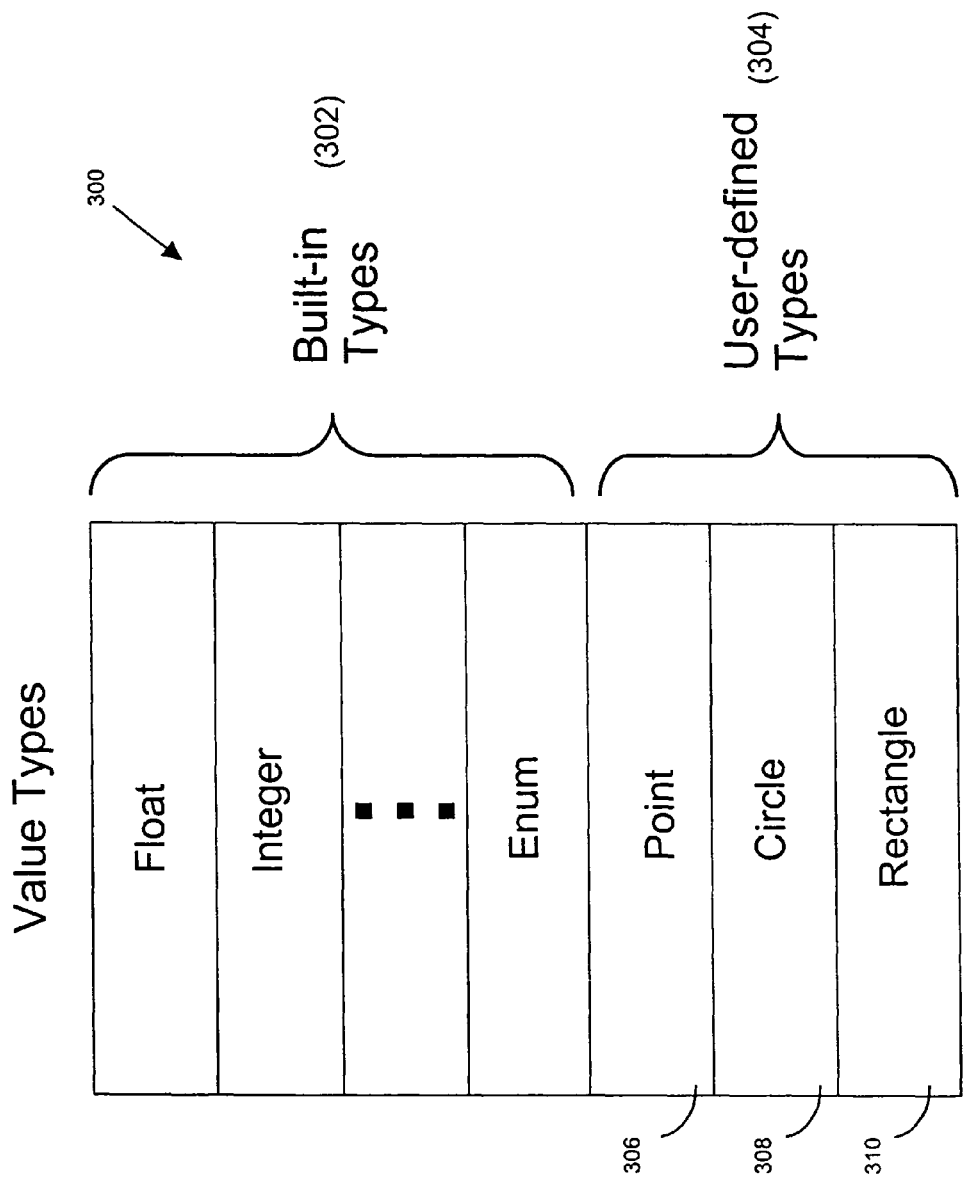
FIG. 3a depicts an exemplary value type list used in an exemplary embodiment of the present invention to categorize data types.
Figure 3B:
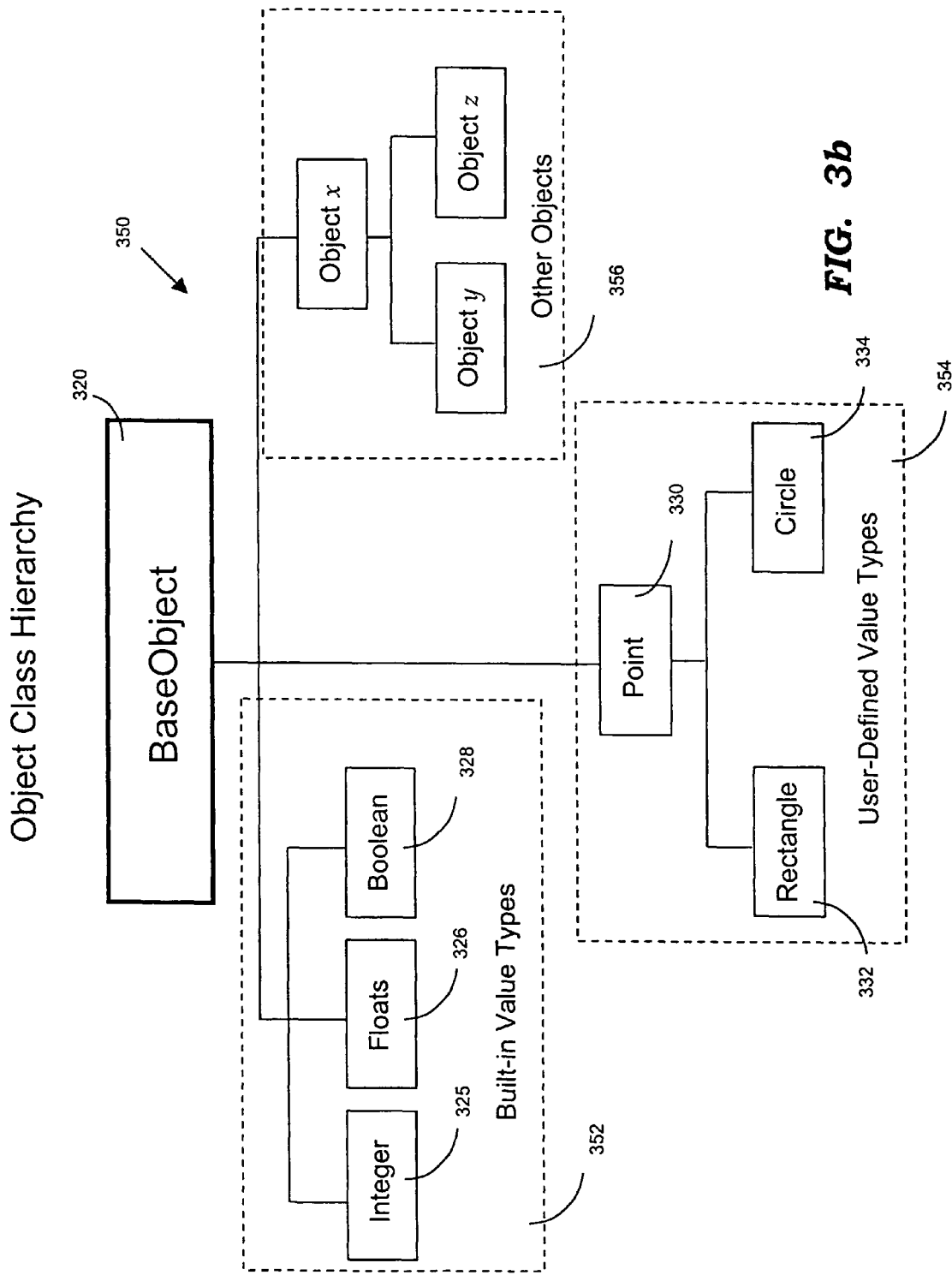
FIG. 3b depicts an exemplary object class hierarchy used in an exemplary embodiment of the present invention to organize objects.

Likewise, the basic object class hierarchy 116 includes fundamental and commonly used classes in an inheritance hierarchy. For example, a root class in the hierarchy may define a "BasicObject", which includes fundamental characteristics (e.g., data and functions) of a basic object in the programming language. Children of the root class may be defined to "inherit" or "extend" the BasicObject class for more specific uses. For example, a "Shape" class and a "Point" class may inherit from the BasicObject class, and a "Rect" class and a "Circle" class may inherit from the "Shape" class. The combination of basic classes comprises an object class hierarchy. Another example object class hierarchy is illustrated in FIG. 3b and is discussed below.

In many programming languages, both built-in value types and basic classes may be extended or customized. For example, in C language, a developer may define a new value type using the keyword "typedef". For example, a value type "coordinate" may be defined as a structure containing two floating point numbers representing X-Y coordinates on a Cartesian plane, as set forth below.

```
typedef struct
{
    float x;
    float y;
} coordinate;
```

Likewise, source code may extend the basic object class hierarchy by inheriting or extending one or more of the basic classes. For example, a user-defined object may extend the basic Shape class to define a "CustomShape" class. Referring again to FIG. 1, both built-in value types and user-defined value types may be represented in source code by value types 110, and both basic and user-defined objects may be represented in source code by objects 112.

In an embodiment of the present invention, the compiler 104 may include type rules 118 that provide the compiler with instructions for properly converting between different value types. For example, in C Language, a source code instruction may assign an integer value to a floating point variable (e.g., "float amount=total;", where "total" is a data value of type integer and "amount" is a floating point number variable). The C compiler can apply the type rules 118 to automatically convert the integer "total" into a floating point number value before generating instructions for assigning the value to variable "amount". Alternatively, the compiler 104 may not provide the appropriate type rule for a given value type combination and operation (e.g., assigning an "integer" value to a "coordinate" variable). In such situations, the compiler may issue a compiler error or throw a runtime exception to signal the error.

In an embodiment of the present invention, source code instructions for performing operations between value types and objects by boxing and/or unboxing one or both of the operands may be compiled and executed transparently to the developer. In a first example, a source code instruction indicates that a value with a value type is to be assigned to an object (e.g., a value with an "integer" value type is assigned to an object of the "Integer" class). To perform such an assignment without boxing would typically cause a compiler error because the types of the operands are not equivalent (i.e., the assignment does not satisfy a type rule). Without boxing/unboxing, a compiler does not perform the assignment because the "integer" value type is not associated with metadata required to populate the Integer object's metadata portion (see FIG. 4).

Instead, the compiler 104 detects the discrepancy between types and generates metadata and compiler code to "box" the "integer" value, thereby converting the value type into an object, so that the boxed value type can be assigned to the Integer object. If the types include a built-in value type, the compiler may be pre-configured with the metadata required to box the value type. If the types include a user-defined value type, the user can provide the required metadata for the compiler to use in the boxing operation. The metadata defining a user-defined type may describe a sequence of bits (i.e., the value) and includes the type name, field names for all fields in the type, field types for all fields, and operations that can be performed in association with the type (e.g., methods). The metadata defining a user-defined type can also include a list of interfaces that the type will implement in its boxed form. Finally, the metadata can include an indication as to where a boxed version of the value type will fit within the object class hierarchy 116, described below in connection with FIG. 3*b*. Thereafter, the compiler 104 generates the object code for assigning the "boxed value type" (or object) to the Integer object.

Rather than generate code to box and unbox value types at the compiler, other embodiments may implement the concept of dual representation in different ways. For example, if the runtime environment that is the target of the code (such as runtime environment 102) can box and unbox value types, then the compiler need only output a box or unbox command as appropriate and the runtime can perform the actual work. In other implementations, boxed and unboxed representations can exist simultaneously with no need for either the compiler or the runtime environment to generate code that boxes or unboxes value types. In other implementations, only the boxed representations may be generated with a mechanism to bypass or ignore the metadata portion when unboxed version is desired.

The output code 108 produced by the compiler 104 logically includes the compiled objects 120 and dual representation 126 of both boxed and unboxed representations (122 and 124) of the value types defined in the source file 100. In one embodiment, all value types are compiled to logically produce both boxed and unboxed representations. The dual representations of the value type itself may occupy effectively the same storage location or, in an alternative embodiment, in individual and distinct storage locations. In another embodiment, only those value types interacting with objects are to be boxed, thereby reducing the size of the output code 108 (i.e., unnecessary metadata is omitted). Furthermore, another embodiment of the present invention may retain a single version of the value type (i.e., boxed or unboxed) at a time, converting dynamically between the two versions, as needed. As such, only one version of the value type need be maintained at any one time, the value type version being dynamically converted by code generated by the compiler in accordance with a given operation (e.g., an assignment, a function call with object parameters, etc.).

In addition, the output code 108 may include metadata associated with a value type. Alternatively, the output 108 may include a machine or executable code representation of the object created by the boxing operation. In yet another alternative, the machine or executable code representation may be generated at runtime, as discussed below.

Another example of source code instructions performing operations between value types and objects by boxing and/or unboxing is provided in the case in which a boxed value type is to be assigned to a value with a unboxed value type (e.g., an object of the Integer class is assigned to a value with an integer value type). To perform such an assignment without unboxing would typically cause a compiler error because the types of the operands are not equivalent.

In an embodiment of the present invention, however; the compiler 104 detects the discrepancy between types and generates code to convert the object to an unboxed value type by deleting or ignoring the metadata associated with the boxed value type, so that the unboxed value type can be assigned to the "integer" value type.

Figure 2:
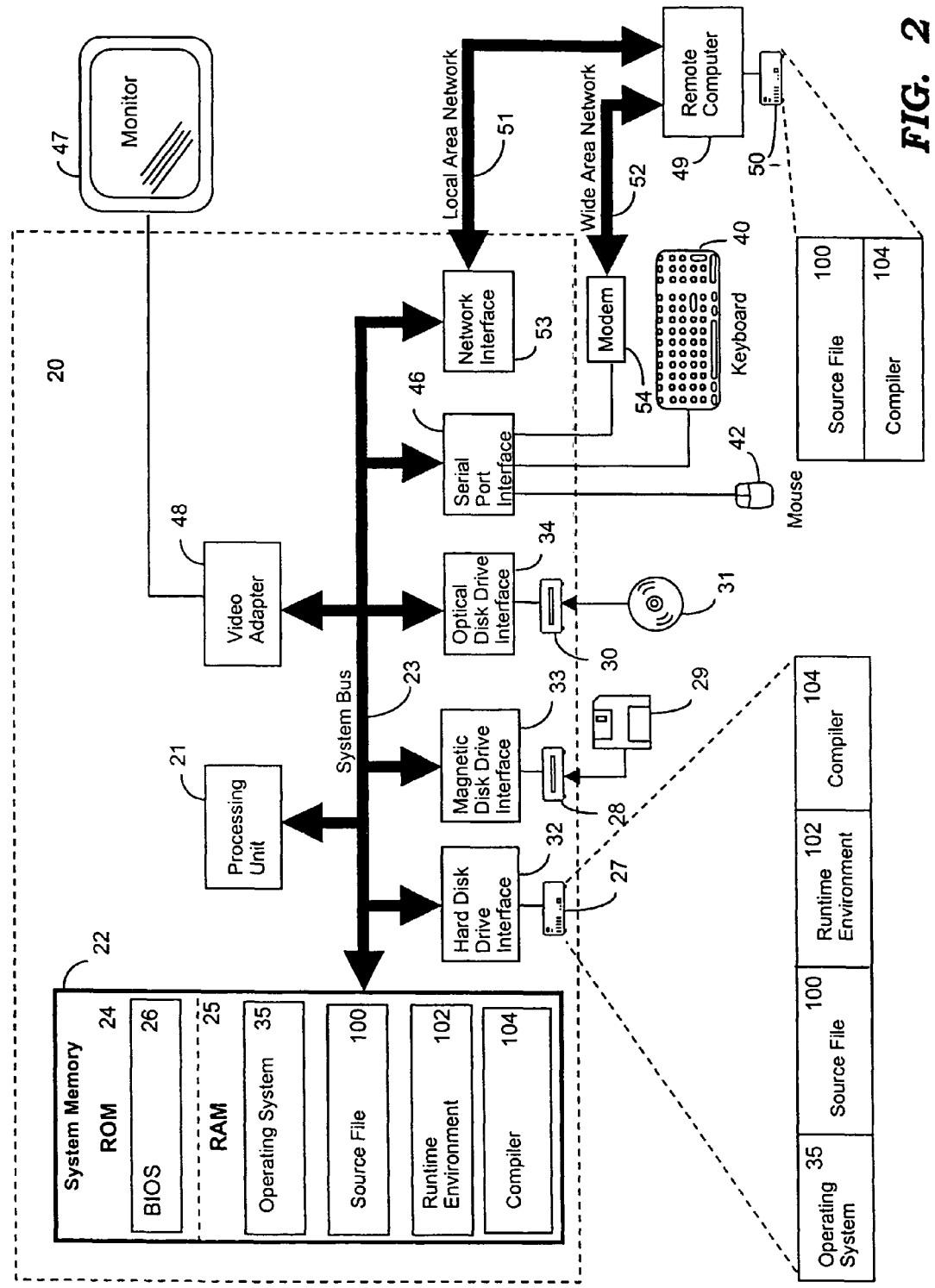
FIG. 2 illustrates a computer system that provides the operating environment for an exemplary embodiment of the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, a source file 100, a Runtime System 102, and a compiler 104. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Computing device, such as personal computer 20, typically includes at least some form of computer readable media. Computer readable media can be any available media that can be accessed by personal computer 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

As described above, in connection with FIG. 1, a compiler 104 receives and compiles a source file 100 written for a runtime environment 102 or any other execution environment. FIG. 3a depicts an exemplary value type classification system 300 for the computer language in which the source file 100 is written. The source file 100 may utilize both built-in value types 302 and user-defined value types 304. Generally, value types define the notion of how to interpret the bit patterns of data stored in a computer. For example, a value may be a simple bit pattern representing an integer or a floating point number. Each value has a type that describes both the size of the storage that the value occupies as well as the meaning of the bits in the value's representation. For example, a value of "2" may be of type "int16." Type "int16" indicates that the bits of the value's representation mean that the value is an integer. Type "int16" further indicates that the value occupies the storage necessary to store a signed 16-bit integer. The type also describes for the compiler the operations that can be performed on the value's representation. Generally, for unboxed value types, the type information is not emitted into the output code. Type "int16" is an example of a built-in value type in an embodiment of the present invention. The previous discussion relating to value types can apply to both user-defined value types and built-in types so that they can be efficiently processed at runtime. If the compiler does not already have access to the metadata for a given value type, particularly for user-defined value types, the user can provide the metadata in a source code file or configuration file.

An exemplary list of data types is depicted in FIG. 3a. The list includes a group of built-in value types 302 and a group of user-defined value types 304. User-defined value types 304 can include virtually any kind of data structure. In most source languages, a user can create a user-defined value type by utilizing combinations of built-in types, such as by defining a type name, a field name for each field in the type, and a field type for each field. In this one illustrative example, the point data type 306 is a two-value data type that defines the Cartesian coordinates of a point in a two-dimensional space. The circle data type 308 is a two-value data type that includes a value of point data type defining a circle's center point and a second value of integer data type defining the magnitude of the radius of the circle. The rectangle data type is a four-value data type that includes a value of point data type for each of a rectangle's corners. Notably, the circle data type 308 and the rectangle data type 310 may utilize the point data type 306. Thus, it can be said that the circle data type 308 and the rectangle data types 310 "inherits" from the point data type 306. In some implementations, this may be a true inheritance; in others, this may simply imply that one value type is used to build other value types.

A user can create metadata to describe a boxed form of a value type. For example, the process of creating a user-defined value type may include a step of specifying the metadata for that type needed for boxing a value type. Typically, the metadata defining a user-defined type 304 describes a sequence of bits (i.e., the value) and includes the type name, field names for all fields in the type, field types for all fields, and operations that can be performed in association with the type (e.g., methods). The metadata defining a user-defined type can also include a list of interfaces that the type will implement in its boxed form. Finally, the metadata can include an indication as to where a boxed version of the type will fit within the object class hierarchy 116, described below in connection with FIG. 3*b*. This metadata may be used by the compiler, the loader, and/or the runtime environment to verify type safety and manage boxed versions of the value type.

FIG. 3*b* depicts an exemplary object class hierarchy 350. Generally, objects of the class hierarchy 350 are more complex data types than value types 300. Each object is self-typing, in that each object's type is explicitly stored in its representation in the output code. An object has an identity (e.g., object name, class name) that distinguishes it from all other objects. Each object has fields (or data members) that can be used to store other data, including values (with associated value types) and methods associated with the object. Of course, the fields in an object can themselves be objects. An object can also include location information (e.g., a pointer) and interface information. The objects of a class hierarchy, such as class hierarchy 350, typically derive from a base root object. In FIG. 3*b*, such a base root object is illustrated by BaseObject 320. Thus, other objects are shown below BaseObject 320 in the object class hierarchy 350 and, therefore, inherit from the BaseObject 320.

The object class hierarchy of FIG. 3*b* illustrates the dual representation of value types in one aspect of the invention. FIG. 3*b* shows a representative class hierarchy that includes the boxed representations of the value types illustrated in FIG. 3*a*. In the object class hierarchy 350, built-in value types 352 (e.g., integer 325, floats 326, and Boolean 328) and user-defined value types 354 (e.g., point 330, rectangle 332, and circle 334) are stored as any other object 356 within the object class hierarchy. The built-in value types 352 and user-defined value types 354 depicted in FIG. 3*b* are boxed value types. Thus, the built-in value types 352 and user-defined value types 354 may be processed at runtime on the same basis as any other object in the hierarchy. As stated above, a boxed value type is created from an unboxed value type by associating the unboxed value type with metadata providing the boxed value type with object-like attributes. Metadata will be described in more detail in connection with FIG. 4.

Notably, a "child" object, such as Object y, inherits the attributes of a "parent" object, such as Object x. If a method is associated with Object x, for example, then the method is also associated with Object y, by inheritance. One aspect illustrated in FIG. 3*b* is that the boxed representations of value types may include parent-child relationships, even though there is no notion of parent-child relationship in value types. For example, in FIG. 3*b* both circle and rectangle derive from point. Similarly, child boxed value types (e.g., circle value type 334) inherit methods and other attributes from parent boxed value types (e.g., point value type 330). Such inherited methods are referred to as virtual methods. Because of the dual representation of value and object types in the present invention, developers need not worry which form is passed to methods. Thus, an unboxed value type may be passed into an object method where a boxed representation is expected or vice versa. The compiler and/or runtime can select the appropriate representation either at compile or run time as appropriate for the particular implementation.

The dual representation of value types both as unboxed value types and as boxed value types in the object class hierarchy implies that value types can have methods and can behave as objects in some instances and as unboxed value types in other instances. The practical effect is that when value types are in their boxed representation, they can have methods like other objects. When value types are in their unboxed representation, they can be valid arguments to methods that would otherwise expect an object type (such as a boxed representation). Because both the boxed and unboxed value type representations can be made available, this functionality can be provided without the developer having to explicitly specify either what version to use or the conversion from one form to another.

A data type fully describes a value if it completely defines the value's representation and the operations that can be performed on the value. For a data type, defining the value's representation entails describing the sequence of bits that make up the value's representation. Defining the set of operations that can be performed on a data type entails specifying named methods for each operation. A named method describes an operation that can be performed in association with a data type.

For an object, defining the object's representation entails describing the object's location and the sequence of bits that make up the object's representation. Thus an object includes a definition of the object's contents and the operations that may be performed on that object. When an object contains a value, this definition includes the value's representation and the operations that can be legally performed in association with the value (e.g., methods). Defining an object entails describing the sequence of bits that make up the value's representation (self describing data), the location of the object (pointer data), and at least one named method for the object (interface data).

Thus, an object differs from an unboxed data type, in that an object includes not just raw data (i.e., a value representation), but also other data including the location of the object. This other data is stored in the object as metadata. Advantageously, metadata can be stored in a way that is independent of any particular programming language. Thus, metadata provides a common interchange mechanism for use between tools that manipulate objects (e.g., compilers, debuggers).

Turning now to FIG. 4, an unboxed value type 400 is depicted as containing only raw value data 401 (i.e., a value representation). A boxed value type 402 is depicted as containing raw value data 401, as well as metadata 404. For every value type (built-in or user-defined), a corresponding boxed value type can be created. Boxed data types have the characteristics of objects, as described above, because the metadata provides a means for associating the boxed data type with value-describing data, location data, and method data. Thus, the association of metadata with the boxed value type permits the storage of the boxed value type within the object class hierarchy 320 of FIG. 3*b*. In an exemplary embodiment of the present invention, the boxed and unboxed value types depicted in FIG. 4 can be stored in the output code 108 (FIG. 1). It should be understood that FIG. 4 illustrates a logical representation of a boxed value type, indicating that metadata is associated with the storage location of the value type.

Functional software components of another system 500 that incorporates aspects of the present invention are shown in FIG. 5. The system 500 incorporates at least one front end compiler, such as compilers 502, 504 and 506, which are not intended to show requirements of the present invention but merely to illustrate concepts of the present invention applied to multiple or combined front end systems. The front end compilers 502, 504 and 506 are capable of parsing and analyzing different types of source language files, such as source files 508, 510 and 512, respectively. These source files 508, 510 and 512 can include built-in value types, user-defined value types, and objects. In this embodiment, the front end compilers 502, 504 and 506 each produce a common language output file 514, 516 and 518. Generally, compilers 502, 504 and 506 are functionally similar to compiler 104, described in connection with FIG. 1.

In an exemplary embodiment of the present invention, the common language output files 514, 516 and 518 have executable instructions in a "common" (in the sense of universal) intermediate language suitable for representing the concepts of a plurality of different types of source languages, e.g., procedural, functional and object oriented languages, so that only one type of intermediate language need be used regardless of the specific source language used. The executable instructions within the common language output files 514, 516 and 518 can be either instructions that can be directly executed by a processor (e.g., object or native machine code) or an "intermediate" type instruction (e.g. Java bytecodes, p-code, or other intermediate language) that is executed within some type of execution environment.

The front end compilers 502, 504 and 506, in addition to being able to read and analyze their respective source files 508, 510 and 512, are capable of reading and analyzing files represented in the common language. Moreover, a library declarations file 520 of functions represented in the common language is available for use by the front end compilers 502, 504 and 506.

The common language files 514, 516 and 518, once compiled, may be transmitted to an execution environment or runtime environment 522. In this application, execution environment and runtime environment are used interchangeably. The execution environment may be either a direct execution environment, a managed runtime environment or an unmanaged runtime environment. Advantageously, any necessary conversions of unboxed value types to boxed value types (or vice versa) may be performed either at the compiler stage, thereby permitting the use of such converted value types without regard to the managed or unmanaged status of the runtime environment, or by the runtime environment. Indeed, the environment may be any other type of environment capable of reading and executing the compiled files 514, 516 and 518. The runtime environment 522 shown in FIG. 5 represents a managed environment having a plurality of features, functions and services, as discussed below.

Prior to being supplied to the runtime environment 522, each output file 514, 516 and 518 may undergo optional processing as illustrated by the separate optional processing section 524 or the integral optional processing section 526. Generally, optional processing may involve verification, type checking, and or any translation of the common language file into a form suitable for use by the runtime environment 522. Hence, optional processing may be used to translate, interpret or otherwise convert the received common output files 514, 516 and 518, into output code that can be executed in the execution environment 522.

In the case where the execution environment 522 is a managed runtime environment as shown in FIG. 5, then runtime environment itself has a loader 530 which loads the files for execution. The loader 530 receives the executable file and resolves necessary references and loads the code. The environment may provide a stack walker 532, i.e., the piece of code that manages the method calls and provides for the identification of the sequence of method calls on a stack at a given point in time. A layout engine 534 may also be provided, which establishes the layout, in memory, of the various objects and other elements as part of the application to be executed. The execution environment may further provide a security module 536 to prevent unauthorized use of resources by determining whether certain code has permission to access certain system resources (or even execute at all). The runtime environment may further provide memory management services, such as a garbage collector 538, and other developer services 540, such as debuggers and profiling. Other types of services that can be provided by a managed execution environment include verification of code before it is executed, among others.

The execution environment 522 may further utilize a common library program file 528, which has the actual implementation information to carry out the functionality of the common library declarations 520.

During runtime, the output files 514, 516 and 518 are loaded into the runtime environment 522. Importantly, the information that is provided to the runtime environment, such as the boxed or unboxed value types shown in FIG. 4, is used by the runtime environment to shape objects prior to runtime. The layout engine generally uses the information to create data structures for each of the types of classes including the appropriate method and field information.

Figure 6:
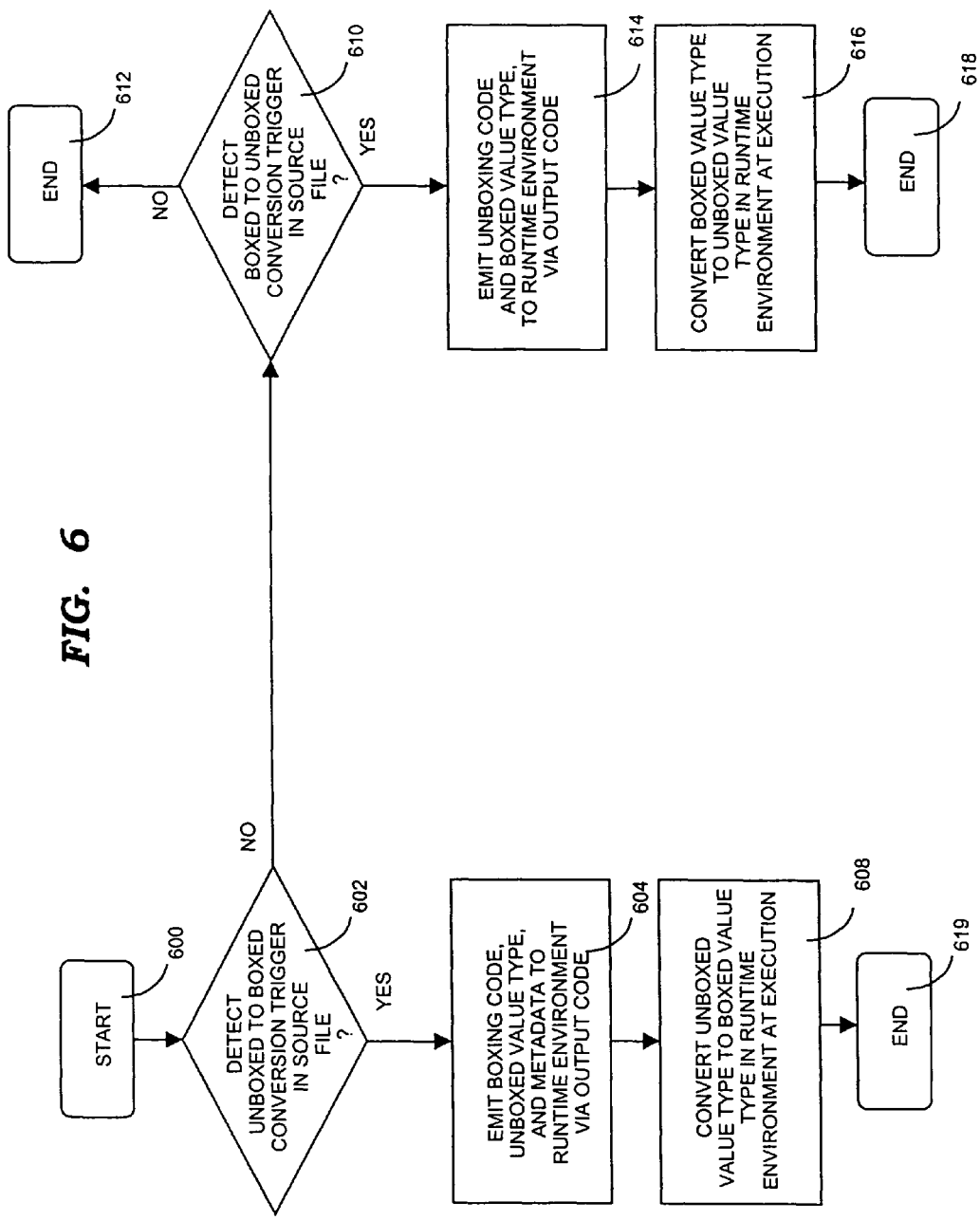
FIG. 6 illustrates a method for boxing and unboxing a value type in an exemplary embodiment of the present invention.

FIG. 6 depicts an operation flow for boxing and unboxing an individual value type in an exemplary embodiment of the present invention. Because the boxing and unboxing can be done automatically, both versions of a particular data type can be made to be always available at runtime. Accordingly, the most efficient form of the value type can be selectively used, depending on the situation (e.g., assigning an unboxed value type to an object). Of course, the conversion can also be avoided in instances where the compiler 104 determines that the converted form of the value type is not needed.

The logical operations in FIG. 6 are implemented (1) as a sequence of computer implemented steps or a program module running on a computing system and/or (2) as interconnected logic circuits or machine logic modules within the computing system. The implementation is a matter of choice dependent on the performance requirements of the computing system implementing the invention. Accordingly, the logical operations making up the embodiments of the present invention described herein are referred to variously as operations, steps or modules. It will be recognized by one skilled in the art that these operations, steps and modules may be implemented in software, in firmware, in special purpose digital logic, and any combination thereof without deviating from the spirit and scope of the present invention as recited within the claims attached hereto.

In one embodiment of the present invention, the operations of FIG. 6 start at step 600 and proceed to unboxed test operation 602. Test operation 602 detects whether the source file includes a trigger requiring an unboxed to boxed conversion. An unboxed to boxed conversion trigger can be any entity in the source file that indicates that an unboxed to boxed conversion is needed. Examples of unboxed to boxed conversion triggers include situations where an unboxed value type is assigned to a boxed value type and where an unboxed value type is passed to an object expecting a boxed value type or another object. In both of these example cases, an unboxed to boxed conversion would be required. If test operation 602 detects that the source file includes a trigger requiring an unboxed to boxed conversion, then the operation flow branches YES to unboxed value type emit operation 604. The unboxed value type emit operation 604 emits code from the compiler to perform the unboxed to boxed conversion, the unboxed value type, and the metadata associated with the unboxed value type to the runtime environment via the output code. The operation flow then proceeds to conversion operation 608, which at runtime converts or builds a boxed value type from the emitted code, the unboxed value type, and the metadata associated with the unboxed value type. Operation flow proceeds to operation 619 and ends for the converted value type.

The boxed value type can include the definition of the type name, the field names, field types, and operations that can be performed in association with the boxed value type (e.g., methods). Creation of the boxed value type can also include the creation of metadata representing the appropriate position of the boxed value type in an object class hierarchy and any relationships with other boxed value types.

Notably, boxed test operation 610 is also reached if a determination is made at unboxed test operation 602 that the source file does not include a trigger requiring an unboxed to boxed conversion. Boxed test operation 610 detects whether the source file includes a conversion trigger requiring a boxed to unboxed conversion. If the source file does not include a conversion trigger requiring an unboxed to boxed conversion, then the operation flow branches NO to step 612 and ends for the converted value type.

On the other hand, if boxed test operation 610 detects that the source file includes a conversion trigger requiring a boxed to unboxed conversion, then the operation flow branches YES to boxed value type emit operation 614. The boxed value type emit operation 614 emits code to perform the boxed to unboxed conversion, the boxed value type, and the metadata associated with the boxed value type to the runtime environment via the output code. The operation flow then proceeds to conversion operation 616 and converts or builds an unboxed value type from the code to perform the boxed to unboxed conversion, the boxed value type, and the metadata associated with the boxed value type in the output code.

A boxed to unboxed conversion trigger can be any entity in the source file that indicates that the conversion is needed. Examples of conversion triggers include situations where a boxed value type is assigned to an unboxed value type and where a boxed value type is passed to an object expecting an unboxed value type. In both of these example cases, a boxed to unboxed conversion would be required. The operation flow proceeds to step 618 and ends with regard to the converted value type.

It will be appreciated that the operation of FIG. 6 may be modified so that a conversion is not necessarily performed for each value type detected in a source file. A preliminary determination may also be made as to whether a conversion is appropriate. For example, a compiler may recognize that a boxed, built-in value type is never implemented in its unboxed format by the source file. In such a case, a conversion may be avoided as unnecessary.

As discussed, the process described with regard to FIG. 6 relates to the logical processing of an individual value type. Typically, however, multiple value types are included in a source code file and may require boxing and unboxing as appropriate. In one embodiment of the present invention, the detecting operations 602 and 610 and the emitting operations 604 and 614 are generally performed for multiple value types during a compilation stage before proceeding to the converting operations 608 and 616 during runtime. In this manner, most (or all) required converting code is emitted into the output code for execution during runtime.

In an alternative embodiment of the present invention, however, the detecting operations 602 and 610 and the emitting operations 604 and 614 may also be performed during runtime. The "emitting" operations are embodied by a call to boxing or unboxing code during runtime. Such an embodiment is disclosed with regard to FIGS. 7 and 8, for example.

During execution of the object code 106 (FIG. 1), the runtime environment, such as runtime environment 522 (FIG. 5), may determine whether to use the boxed or unboxed version of a particular data type as in the implementation of a virtual method. In an embodiment, the flow 700 illustrates a particular situation wherein the runtime environment performs the selection operation, as compared to the compiler. Initially, the flow generally begins with defining operation 702, which defines a particular value type that is to be used in a function call. Defining the value type generally relates to providing some information as to whether the value type is boxed or unboxed. In an embodiment, a bit may be associated with the value type and the bit is either set or cleared depending on whether the value type is boxed or unboxed.

Once the value type has been defined, pass operation 704 passes the defined value type to a particular function. In essence during compile time, the compiler emits code to provide for the passing of the value type to the function during runtime. Passing a parameter of this sort to a function is straightforward and effectively provides the necessary value type information to the function for operation.

The particular function that receives the defined value type expects either a boxed or unboxed value type. Therefore, following the passing operation 704, determination act 706 determines whether the passed value type is the same as the expected value type. The determination may be a simple testing of a bit associated with the value type or some other operation that evaluates the type of data passed to the function.

If determination operation 706 determines that the passed value type is not the same as the expected value type, flow branches NO to modify operation 708. Modify operation either boxes or unboxes the passed value type, and passes the new value type to the function. In an embodiment where the function expected a boxed value type but received an unboxed value type, step 708 boxes the value type. On the other hand, had the function expected an unboxed value type but received a boxed value type, then operation 708 would unbox the value type. The result of the box operation 708 is a pointer to an object describing the unboxed value type. Following the modification operation 708, flow continues with call operation 710, which is described below.

If the determination step 706 determined that the passed value type was the same as the expected value type, then flow branches YES to call operation 710. Essentially, had the function received a value type that was expected, no modification, such as modification operation 708, would be necessary. Thus, flow continues with call operation 710.

Call operation 710 calls a member method associated with the defined function. The method may be a virtual method, e.g., wherein the compiler could not determine one certain method to call at compile time and therefore implemented multiple versions, such as in the case with superclasses or in the case wherein the function may receive both boxed and unboxed versions of value types. The member method is related to a user defined method for operating on the passed value type. At compile time, the compiler emits the code for performing the various methods within the function. However, since the function may receive different types, the compiler does not insert the specific code within the function for each type. Instead, the compiler creates a virtual method table. The virtual method table comprises the necessary information to perform the method for each of the specific value types that the function may receive.

Therefore, once the method has been called at 710, the runtime environment executes the method call using the reference to the appropriate method in the virtual method table. More specifically, lookup operation 712 looks up the particular method related to the passed value type. Once the particular method for that type is found, execute operation 714 executes the method for that value type.

As stated, the above-described flow of operations is able to handle either boxed or unboxed parameters. A key feature relates to the use of a virtual table to provide methods for the different value types that may be passed to a particular function. Since the function may receive different types and since the compiler is unaware of which type the function will receive, the runtime environment performs the necessary analysis and resolves any discrepancies between value types.

Figure 7:
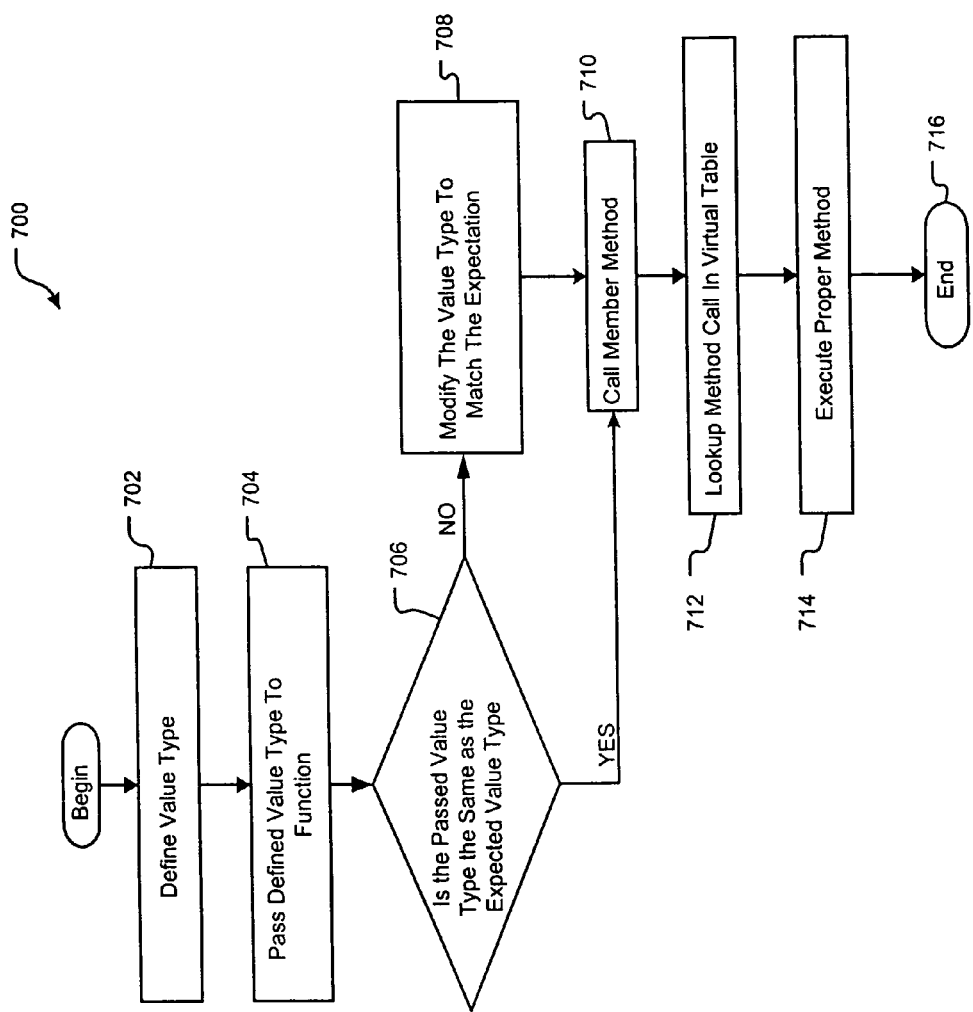
FIG. 7 illustrates a method for implementing the boxing and unboxing of a value type at runtime in an embodiment of the present invention.
Figure 8:
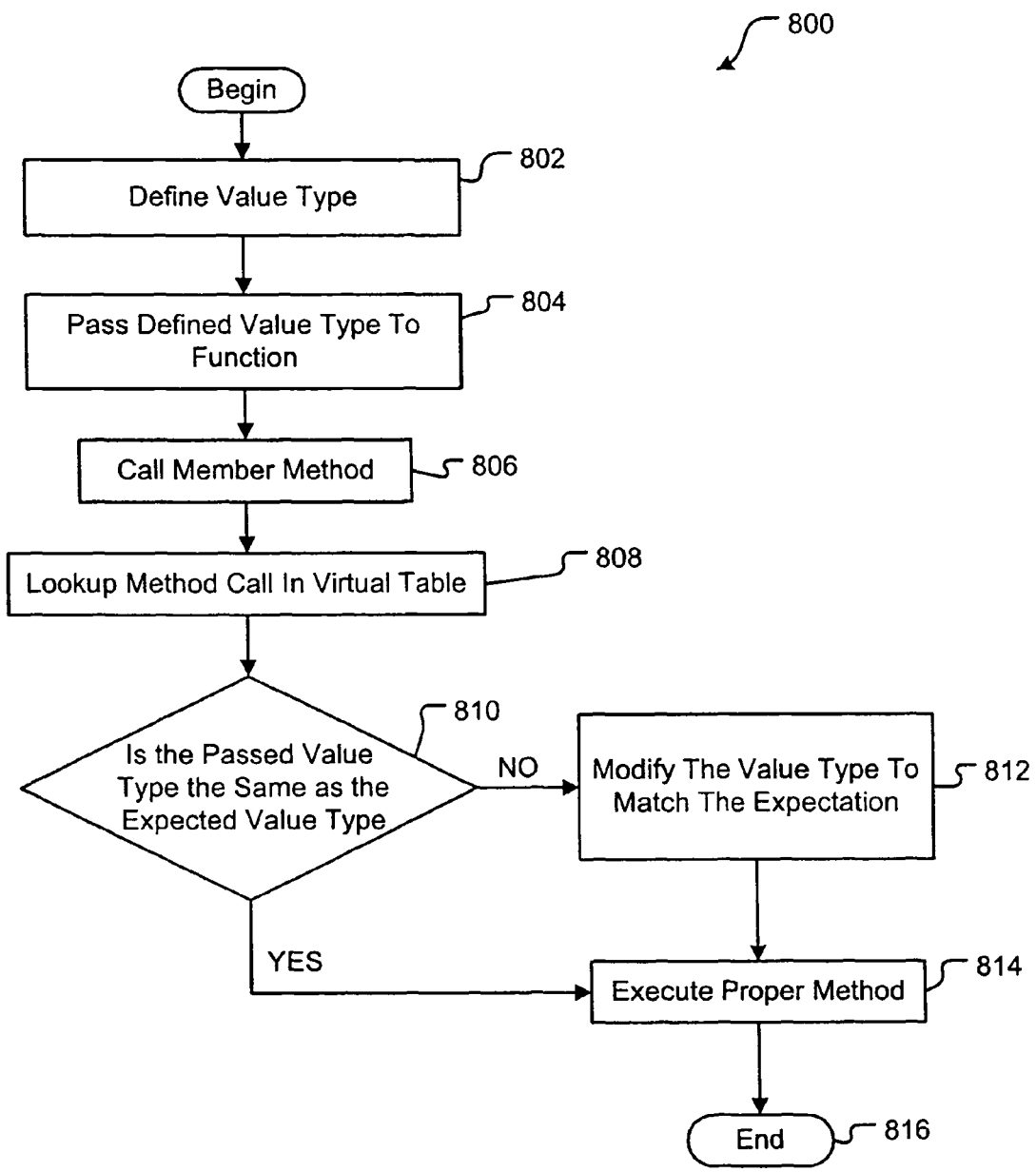
FIG. 8 illustrates an alternative method for implementing the boxing and unboxing of a value type at runtime in an embodiment of the present invention.

A flow 800 of operations in an alternative embodiment to that shown in FIG. 7 is shown in FIG. 8. The first two acts of flow 800, define operation 802 and pass operation 804 are similar to acts 702 and 704 described above in conjunction with FIG. 7. That is, define operation 802 defines the value type as boxed or unboxed and then pass operation 804 passes the value to the function.

Once passed, call operation 806 then calls the member function. This act is similar to call operation 710 described above wherein the actual method is called. Following the call operation 806, lookup operation 808 looks up the called method for the passed value type in the virtual method table. Lookup operation 808 is similar to operation 712 described above.

Following call operation 806 and lookup operation 808, determination act 810 determines whether the passed value type is the same as the expected value type. Determination act 810 is similar to the determination act 706 described above in that the passed value type is analyzed against the expected form of the value type. One difference, however, is that the code for performing the determination act may actually reside in the front portion of the called method code, as described below.

If the determination act 810 determines that the passed value type is different from the expected form, then flow branches NO to modify operation 812. Modify operation 812 is similar to modify operation 708 described above in conjunction with FIG. 7. Essentially, if the modification is necessary, modification act 812 performs the necessary acts required to box or unbox the value type as needed, (e.g., calls appropriate boxing or unboxing code). Once modified, execute operation 814 executes the method using the modified value type.

If, on the other hand, determination act 810 determines that the passed value type is the same as the expected value type, then execute operation 814 performs the method using the passed value type. Since the passed value type was the same as the expected value type, then no modification act, such as act 812, is needed prior to execution.

The embodiment shown in FIG. 8 allows the caller object to simply call a method and pass a value type to that function that performs the method. The caller does not have to make a determination as to whether the value type is correct. Such a caller object may then be streamlined such that it performs fewer operations. The tradeoff, however, is that the method or some other module must perform the determination operation. In essence, the plumbing may reside as a small portion of code that is performed prior to the execution of the method. When the number of callers outweighs the number of called methods, such a streamlining of the caller objects may be helpful.

Thus, the present invention is presently embodied as a method, apparatus, or article of manufacture, such as computer readable media or program product containing a computer program, for processing objects of various programming languages and for boxing and unboxing a user-defined data type. While the invention has been particularly shown and described with reference to preferred embodiments thereof, it will be understood by those skilled in the art that various other changes in the form and details may be made therein without departing form the spirit and scope of the invention.

What is claimed is:

1. A computer storage medium storing computer executable instructions that when executed by a processor provide a unified type system for use with a computer source language and associated components which translate source files written in the computer source language into executable form and execute the translated source files, wherein at least one source file declares a variable using an unboxed value type representation yet passes the variable to a method expecting a boxed value type representation, the unified type system comprising:
   a first value type representation relating to the unboxed value type representation of the variable;
   a class object hierarchy comprising a plurality of object classes, wherein at least one of the object classes is a second value type representation relating to the boxed value type representation of the variable, wherein the second value type representation is automatically passed to the method expecting the boxed value type representation; and wherein
   a trigger located in the source file indicating a required conversion from the unboxed value type representation to the boxed value type representation when it is detected that the method expects the boxed value type representation, wherein as part of translating the source files and executing the translated source files maintaining both the boxed value type representation and the unboxed value type representation.

2. A computer storage medium as defined in claim 1 wherein the first value type representation includes metadata identifying the second value type representation, and wherein the metadata is defined by the user.

3. A computer storage medium as defined in claim 1 wherein the second value type representation inherits one or more interfaces from a parent object class in the class object hierarchy.

4. A computer storage medium as defined in claim 1 wherein the second value type representation is automatically passed to the method expecting the boxed value type representation at runtime.

5. A method for use by a compiler executing on a processor, the compiler compiling source code into executable intermediate language code, the method comprising:
   upon detecting in the source code a trigger to pass an unboxed value type representation of a variable of a first value type to a method expecting a boxed value type representation,
   inserting, in the intermediate language code, a boxing instruction, wherein the boxing instruction when executed creates a boxed value type representation of the variable based on the first value type and wherein the boxing instruction does not correspond to an explicit instruction in the source code for creating a boxed value type representation of the variable, wherein as part of compiling the source files and executing the compiled source files maintaining both the boxed value type representation and the unboxed value type representation.

6. A method as defined in claim 5 wherein the boxing instruction when executed instantiates an object of a class of objects associated with the first value type, passes the unboxed value type representation of the variable to a first method of the object, and returns a reference to the object.

7. A method as defined in claim 5 further comprising:
inserting in the intermediate language code at least one instruction that passes the reference to a second method expecting the boxed value type representation in place of an instruction in the source code that passes the unboxed value type representation to the second method.

8. A method as defined in claim 5 further comprising inserting in the intermediate language code instructions to initialize an unboxed value type representation of the variable.

9. A computer storage medium storing computer executable instructions for a compiler that translates files written in at least one computer source language into computer executable files, wherein when the instructions are executed the compiler translates a computer source language file, containing computer source language instructions to assign an unboxed value type representation of a variable and to pass the unboxed value type representation to a method expecting a boxed value type representation, into an executable file containing instructions that create both an unboxed value type representation of the variable and a boxed value type representation of the variable; and wherein
a trigger in the source file indicates a required conversion from the unboxed value type representation to the boxed value type representation,
wherein as part of translating the source files and executing the translated source files maintaining both the boxed value type representation and the unboxed value type representation.

10. A computer storage medium as defined in claim 9 wherein the compiler further translates the computer language source file into instructions that pass the boxed value type representation to the method expecting the boxed value type representation.

11. A computer storage medium as defined in claim 9 wherein the boxed value type representation is an object of a first boxed object class in a class object hierarchy, wherein the first boxed object class is selected from a plurality of boxed object classes based on the instructions to assign the unboxed value type representation.

12. A computer system for providing an expected value type representation to a requesting method, the computer system comprising:
at least one processor; and
at least one memory, communicatively coupled to the at least one processor and containing computer-readable instructions that, when executed by the at least one processor, perform a method comprising:
storing in a source code file a declared representation of a variable, wherein the declared representation is an unboxed value type representation of the variable;
detecting a trigger in the source file indicating that the requesting method requests the variable in an expected value type representation;
wherein when the expected value type representation is a boxed value type representation;
automatically converting the unboxed value type representation to the boxed value type representation; and
maintaining both the unboxed value type representation and the boxed value type representation in memory; and
providing the expected value type representation to the requesting method.

13. The computer system of claim 12, wherein the unboxed value type representation is associated with metadata identifying the boxed value type representation.

14. The computer system of claim 12 further comprising:
wherein when the expected value type representation is the unboxed value type representation, not performing the converting and maintaining steps and providing the unboxed value type representation to the requesting method.

* * * * *